US012330219B2

(12) United States Patent
Soula et al.

(10) Patent No.: US 12,330,219 B2
(45) Date of Patent: Jun. 17, 2025

(54) METHOD FOR MAKING A METAL PART WITH A COMPLEX GEOMETRY WITH A THIN WALL

(71) Applicants: SAFRAN, Paris (FR); Safran Nacelles, Gonfreville l'Orcher (FR)

(72) Inventors: Aurelie Soula, Gonfreville l'Orcher (FR); Pierre Sallot, Moissy-Cramayel (FR)

(73) Assignees: SAFRAN, Paris (FR); Safran Nacelles, Gonfreville l'Orcher (FR)

( * ) Notice: Subject to any disclaimer, the term of this patent is extended or adjusted under 35 U.S.C. 154(b) by 204 days.

(21) Appl. No.: 18/082,945

(22) Filed: Dec. 16, 2022

(65) Prior Publication Data

US 2023/0118657 A1 Apr. 20, 2023

Related U.S. Application Data

(63) Continuation of application No. 16/714,391, filed on Dec. 13, 2019, now Pat. No. 11,534,825, which is a (Continued)

(30) Foreign Application Priority Data

Jun. 13, 2017 (FR) ...................... 17/55304

(51) Int. Cl.
*B22F 5/00* (2006.01)
*B22F 1/06* (2022.01)
*B22F 1/10* (2022.01)
*B22F 1/102* (2022.01)
*B22F 3/03* (2006.01)
(Continued)

(52) U.S. Cl.
CPC ................ *B22F 5/009* (2013.01); *B22F 1/06* (2022.01); *B22F 1/10* (2022.01); *B22F 1/102* (2022.01); *B22F 3/03* (2013.01); *B22F 3/1021* (2013.01); *B22F 3/15* (2013.01); *B22F 2998/10* (2013.01); *B22F 2999/00* (2013.01); *F01D 25/30* (2013.01);
(Continued)

(58) Field of Classification Search
CPC ........ B22F 3/03; B22F 1/0062; B22F 3/1021; B22F 3/15; B22F 5/009; B22F 2998/10; B22F 2999/00; B22F 1/06; B22F 1/10; B22F 1/102; B22F 3/16; B22F 5/10; B22F 7/062; B22F 2005/005; B22F 3/22; F01D 25/30; F01D 5/00; F05D 2230/22; F05D 2300/603; F05D 2230/42; B29C 70/50; Y02T 50/60; B28B 11/003
See application file for complete search history.

(56) References Cited

U.S. PATENT DOCUMENTS 6,524,421 B1 * 2/2003 Chen ...................... B29C 43/10
264/650

FOREIGN PATENT DOCUMENTS

FR 2528743 A1 * 6/1982 ................ B22F 3/12

OTHER PUBLICATIONS

Machine Translation of FR2528743A1 (Year: 1982).*

* cited by examiner

*Primary Examiner* — Adil A. Siddiqui
(74) *Attorney, Agent, or Firm* — Burris Law, PLLC

(57) ABSTRACT

A metal part with a wall thickness less than 5 mm includes a preform made from a flexible composite sheet, a flexible composite sheet segment, and an appended insert including a fastening portion that is sandwiched between a rear end of
(Continued)

the preform and the flexible composite sheet segment. The flexible composite sheet segment encloses the fastening portion of the appended insert.

20 Claims, 3 Drawing Sheets

Related U.S. Application Data continuation of application No. PCT/FR2018/051391, filed on Jun. 13, 2018.

(51) Int. Cl.
*B22F 3/10* (2006.01)
*B22F 3/15* (2006.01)
*F01D 25/30* (2006.01)

(52) U.S. Cl.
CPC .... *F05D 2230/22* (2013.01); *F05D 2300/603* (2013.01)

METHOD FOR MAKING A METAL PART WITH A COMPLEX GEOMETRY WITH A THIN WALL

CROSS-REFERENCE TO RELATED APPLICATIONS

This application is a continuation of U.S. patent application Ser. No. 16/714,391, filed on Dec. 13, 2019, which is a continuation of International Application No. PCT/FR2018/051391, filed on Jun. 13, 2018, which claims priority to and the benefit of FR 17/55304, filed on Jun. 13, 2017. The disclosures of the above applications are incorporated herein by reference.

FIELD

The present disclosure relates to a method for making a metal part with a complex geometry with a thin wall.

BACKGROUND

The statements in this section merely provide background information related to the present disclosure and may not constitute prior art.

The term thin wall means, according to the present disclosure, a wall having a thickness smaller than 5 mm.

The present disclosure concerns in particular, although not exclusively, the field of aeronautical parts, in particular parts for making a nacelle of an aircraft, and more particularly of the aeronautical nozzles.

There is known, in particular from U.S. Publication No. 2006/0039817, a method for making thin composite sheets intended for making cowls, in particular in the field of aircraft nacelles.

These thin composite sheets are made from an atomized metal powder from an alloy bar and mixed with a polymer binder. The obtained mixture is transformed in the form of a flexible composite sheet which is then subjected to a debinding step, that is to say a step of removing the polymer binder, followed by a sintering step, and if necessary, followed by a hot isostatic compaction step. The obtained thin composite sheet has a very low ductility such that a part with a complex geometry can be obtained only by implementing long and expensive methods. Furthermore, when the part must include appended inserts such as flanges or stiffeners, these elements must be fastened by riveting or welding.

SUMMARY

This section provides a general summary of the disclosure and is not a comprehensive disclosure of its full scope or all of its features.

A metal part with a wall thickness less than 5 mm includes a preform made from a flexible composite sheet, a flexible composite sheet segment, and an appended insert including a fastening portion that is sandwiched between a rear end of the preform and the flexible composite sheet segment. The flexible composite sheet segment encloses the fastening portion of the appended insert.

In variations of the metal part, which may be implemented individually or in combination: the composite sheet segment forms a bridge over the fastening portion, the bridge defining a gap between the composite sheet segment, the rear end of the preform, and the fastening portion prior to a debinding and sintering manufacturing step, and the composite sheet segment is configured to deform to fill the gap during the debinding and sintering manufacturing step; the flexible composite sheet includes metal powder; the metal powder has a particle size between 10 µm and 120 µm; the metal powder has a particle size between 10 µm and 45 µm, with a median particle size of 30 µm; the appended insert is a flange; the preform is configured to be applied to a mold having a face defining a relief of the metal part; further including a plurality of stiffeners extending from an outer surface of the metal part; the wall thickness is between 1 mm and 2 mm; the preform is oversized prior to a debinding and sintering manufacturing step to compensate for a shrinkage of the preform; the appended insert defines a hole; a portion of the appended insert that defines the hole extends away from the rear end of the preform; the flexible composite sheet segment is configured to shrink during one of a debinding and a sintering manufacturing step to enclose the fastening portion.

In another form, a metal part with a wall thickness less than 5 mm formed by a process including mixing a metal powder with a polymer binder to form a composite mixture, the metal powder being particles of an atomized metal alloy, making a flexible composite sheet from the composite mixture, cutting, in the flexible composite sheet, a preform of the metal part, applying the preform in a mold having a face defining a relief of the metal part, and debinding and sintering the preform to form the metal part. An appended insert has a fastening portion that is sandwiched between a rear end of the preform and a flexible composite sheet segment. Before the debinding and the sintering steps, the composite sheet segment forms a bridge over the fastening portion, the bridge defining a gap between the composite sheet segment, the rear end of the preform, and the fastening portion. During the debinding and sintering steps, the composite sheet segment deforms to fill the gap and to enclose the fastening portion of the appended insert.

In variations of the metal part, which may be implemented individually or in combination: the process further includes a hot isostatic compaction after the debinding and sintering step; the mold is a half-shell mold including a stop surface, and the mold is disposed during the debinding and sintering such that the preform is applied in the mold and against the stop surface by gravity; the process further includes fastening the appended insert by taking the fastening portion of the appended insert sandwiched between two segments of the flexible composite sheet prior to the debinding and sintering.

In another form, a metal part with a wall thickness less than 5 mm includes a preform cut from a flexible composite sheet, an appended insert disposed on the preform and extending from a rear end of the preform, and a flexible composite sheet segment enclosing a portion of the appended insert to the preform.

In variations of the metal part, which may be implemented individually or in combination: the appended insert is sandwiched between the preform and the flexible composite sheet segment to form a continuous connection; the flexible composite sheet is shrunk to the preform and the appended insert by a debinding and sintering process.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
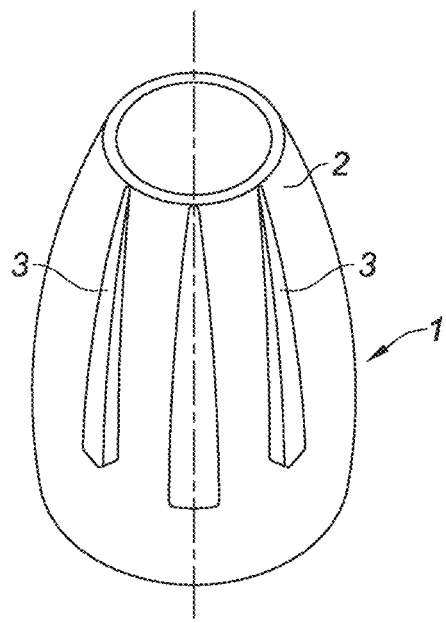
FIG. 1 is a perspective view of a nacelle exhaust nozzle made by implementing the method according to the present disclosure.
Figure 2:
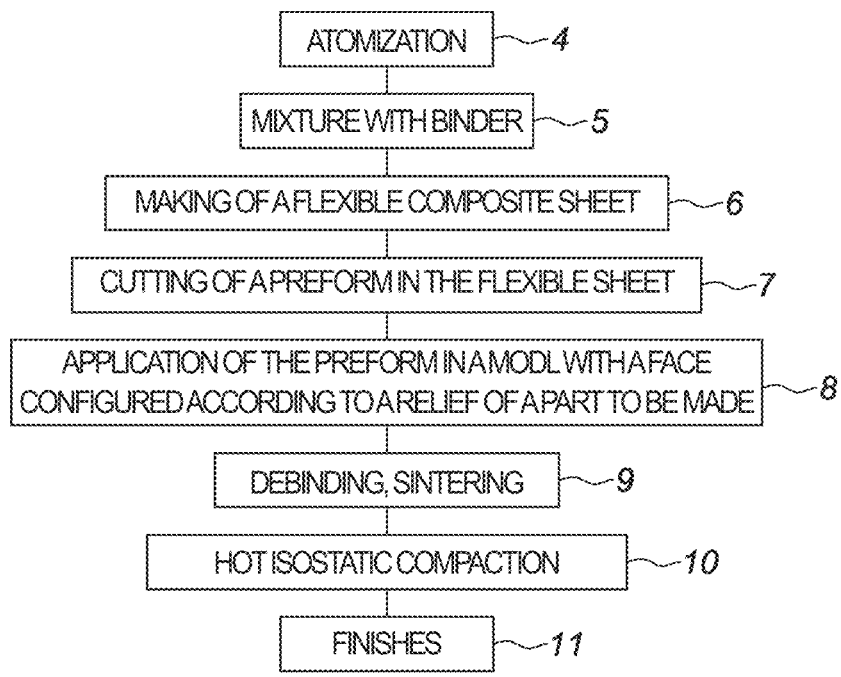
FIG. 2 is a block diagram illustrating the different steps of the method according to the present disclosure.
Figure 3:
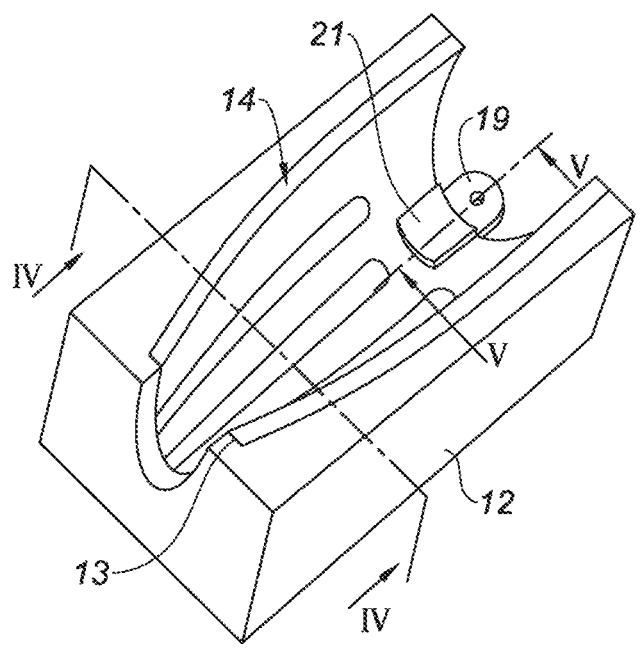
FIG. 3 is a perspective view of a mold filled with a preform before debonding and sintering for a first implementation of the method according to the present disclosure.
Figure 4:
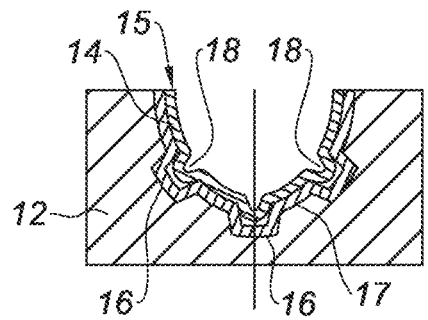
FIG. 4 is a sectional view according to the plane IV-IV of FIG. 3.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The method according to the present disclosure is intended to enable the making of a metal part with a complex geometry with a thin wall, such as a nacelle exhaust nozzle 1 having a thin wall 2 provided with stiffeners 3. For a better understanding of the present disclosure, the thicknesses have been exaggerated compared to the other dimensions of the parts.

The method comprises, in a manner known per se, a first step 4 of atomizing an alloy bar, herein a titanium and aluminum alloy, to produce a metal powder used to perform a mixture 5 with a polymer binder, such as PBHT, PEG, PE, or an acrylic resin, for making 6 a flexible composite sheet. In one form, in an application to an exhaust nozzle made from 1 mm thick sheets, the particle size is comprised between 10 µm and 45 µm, with a D50 of about 30 µm, and the powder mass load is in the range of 60% to 65% and the flexible composite sheet has a thickness of 1 mm to 2 mm depending on the intended use.

According to the present disclosure, the method includes a cutting 7 of a preform followed by an application 8 of the preform in a mold having a face configured according to a relief of the metal part to be made. This step is followed by a debinding and sintering step 9 followed by a hot isostatic compaction 10, itself followed by finishes 11, known per se, such as a brazing, a polishing, etc.

Figure 7:
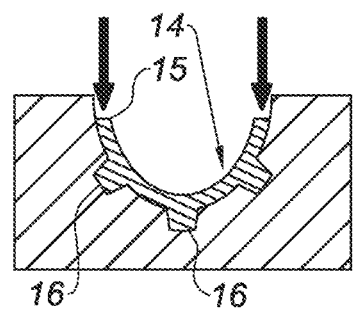
FIG. 7 is a sectional view according to the plane VII-VII of FIG. 6.

FIGS. 3 to 7 illustrate a first implementation of the present disclosure in a half-shell mold 12 including a shoulder 13 forming a stop surface for an end of the preform 14 having longitudinal edges 15 which are flush with the upper opening of the mold 12. The bottom of the mold 12 includes grooves 16 configured to make the stiffeners 3. The preform 14 is engaged in the grooves 16 by forming plies 18. During the debinding, the metal powder grains are released and can be displaced to become uniform, as illustrated by FIG. 7 before being welded to each other during the sintering operation.

The face of the preform 14 which is opposite the bottom of the mold 12 includes a glue layer 17 serving to hold the preform in the mold 12 before the sintering. The rear edge of the preform 14 coincides with the rear edge of the mold 12.

Figure 5:
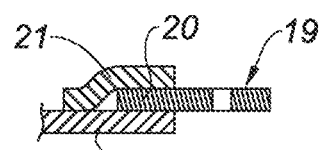
FIG. 5 is a partial sectional view according to the plane V-V of FIG. 3.
Figure 6:
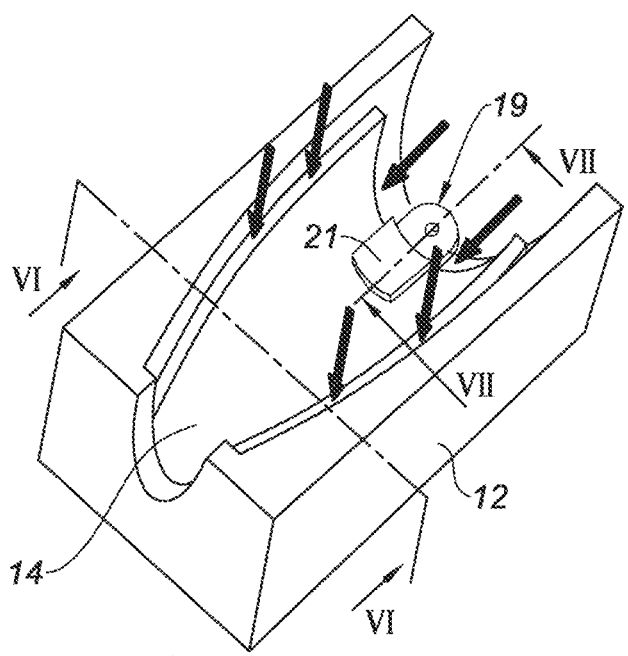
FIG. 6 is a perspective view similar to that of FIG. 3 after debinding and sintering.

An appended insert, herein a flange 19, has a fastening portion 20 which is sandwiched between the rear end of the preform 14 and a flexible composite sheet segment 21. As illustrated in FIG. 5, before the debinding and the sintering, the composite sheet segment 21 forms a bridge over the fastening portion 20.

During the debinding and sintering steps, the mold 12 is inclined downwards such that the front end of the preform 14 remains bearing on the stop surface 13. The shrinkage is therefore performed at the level of the upper edge and the rear edge of the preform as illustrated by arrows in thick line in FIGS. 6 and 7. The dimensions of the preform take this shrinkage into account so that, once out of the mold, the part that is made can be sawn to obtain a half-part of revolution which is welded edge to edge with an identical part to obtain a part of revolution.

Figure 8:
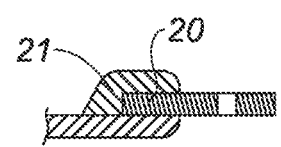
FIG. 8 is a sectional view according to the plan VIII-VIII of FIG. 6.

During the debinding and the sintering, the composite sheet segment 21 is deformed and intimately wraps the fastening portion 20 as illustrated in FIG. 8.

In order to inhibit the preform 14 from adhering to the mold 12 during the debinding and sintering operations, in one form, the inner face of the mold 12 is covered by spraying an anti-adhesion agent such as yttria or alumina.

In order to avoid introducing very considerable stresses between the preform and the mold at the time of the sintering, the mold, in one form, is made of a material having a coefficient of expansion close to the flexible composite sheet. In the case of a flexible composite sheet of a Ti—Al alloy, the mold may be made of a Ti—Al alloy, but it may also be made of alumina or yttria.

Figure 9:
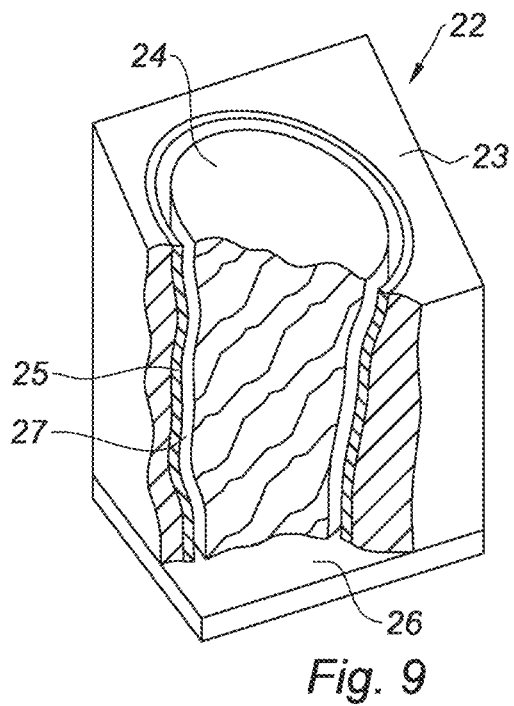
FIG. 9 is a partially broken away perspective view of a mold filled with a preform before debinding and sintering of a second implementation according to the present disclosure.
Figure 10:
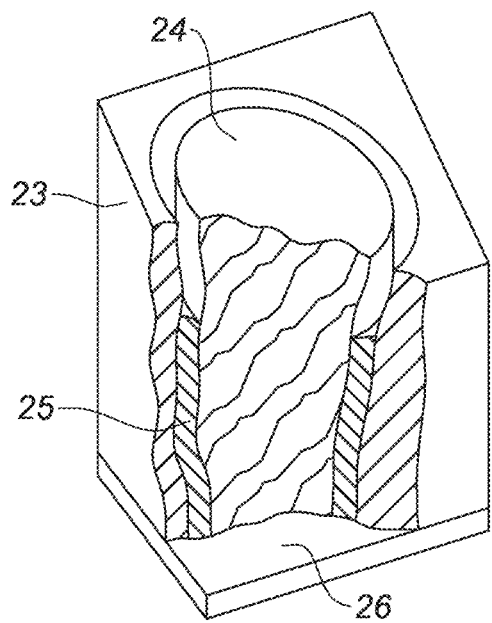
FIG. 10 is a view similar to that of FIG. 9 after debinding and sintering.

FIGS. 9 and 10 illustrate a second implementation of the method according to the present disclosure. The mold 22 includes a female mold portion 23 and a male mold portion 24 which are nested within each other after filling the female portion with a preform 25 made of a flexible composite sheet. The two mold portions are set on a base 26 which forms a common stop surface. In the illustrated example, the inner face of the female mold portion is configured according to a relief of the metal part to be made. A gap 27 of 10 µm to 1000 µm is then provided between the preform 25 and the male mold portion 24 to enable the gases from the debinding to escape. During the debinding, the metal powder settles under the effect of gravity such that the sintered metal thickness is equal to the distance between the faces opposite the male mold portion and the female mold portion.

Figure 11:
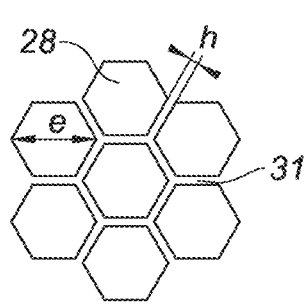
FIG. 11 is a partial top view of a first form of making a configuration promoting the elimination of the binder according to the present disclosure.
Figure 12:
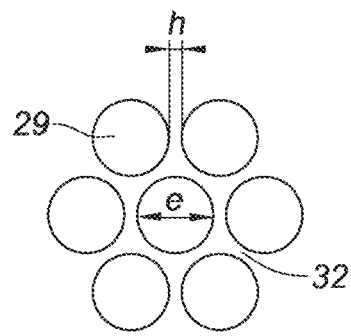
FIG. 12 is a partial top view of a second configuration promoting the elimination of the binder.
Figure 13:
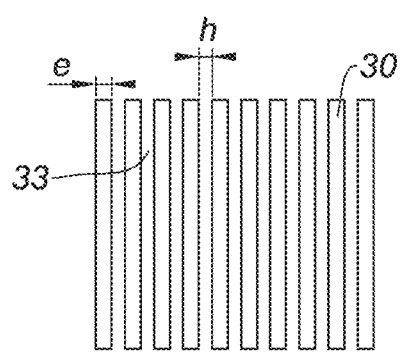
FIG. 13 is a partial top view of a third configuration promoting the elimination of the binder.

In order to allow for enhanced debinding, and in particular an evacuation without accumulation of the gases resulting from the degradation of the binders, at least one mold face opposite a preform made of a flexible composite sheet includes contact pads separated by grooves. FIGS. 11 to 13 illustrate three configuration examples, one in which the pads 28 are hexagonal, the second in which the pads 29 are circular, and the third in which the pads 30 are rectangular. Furthermore, these three configurations have in common that: the non-bearing surface fraction relative to the total surface is from 0 to 70%; considered according to a direction perpendicular to a groove, the pads have a maximum dimension of 1 cm; the grooves, in one form, have a depth larger than 1 mm; and the grooves have a width h which is related to the dimension of the pads by the relationship:

e/h<5, where e designates the dimension of the pads according to a direction perpendicular to a groove, and h designates the width of the groove.

Of course, the present disclosure is not limited to the described implementations and is subject to variants which will appear to those skilled in the art without departing from the scope of the present disclosure as defined by the claims.

In particular, although the present disclosure has been described in connection with an exhaust nozzle of an aircraft, the present disclosure applies to other parts, including outside the aeronautical field.

Although the present disclosure has been described in connection with the making of parts of revolution, it is likely to apply to any part.

Although in the second implementation the preform has been provided to be applied in the female mold portion, it may be in the male mold portion, in particular in the case where the desired relief extends over the inner face of the part.

Although the present disclosure has been described in connection with a metal powder, for example, having a particle size comprised between 10 μm and 45 μm, for making a sheet having a thickness of 1 mm, the particle size may be adapted to the concerned application, and in particular to the desired surface state. As a non-limiting example, for a sheet having a thickness of 2 mm, a particle size of 10 μm to 120 μm may be provided. The load ratio may be adapted to the particle size although a load ratio of 60% to 65% is generally satisfactory regardless of the particle size of the metal powder.

Although the present disclosure has been described in connection with a metal powder made from a Ti—Al alloy, the present disclosure may be implemented from other alloys, in particular alloys containing nickel.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A metal part with a wall thickness less than 5 mm, the metal part comprising:
    a preform made from a flexible composite sheet;
    a flexible composite sheet segment; and
    an appended insert including a fastening portion that is sandwiched between a rear end of the preform and the flexible composite sheet segment,
    wherein the flexible composite sheet segment encloses the fastening portion of the appended insert.

2. The metal part of claim 1, wherein the composite sheet segment forms a bridge over the fastening portion, the bridge defining a gap between the composite sheet segment, the rear end of the preform, and the fastening portion prior to a debinding and sintering manufacturing step, and the composite sheet segment is configured to deform to fill the gap during the debinding and sintering manufacturing step.

3. The metal part of claim 1, wherein the flexible composite sheet includes metal powder.

4. The metal part of claim 3, wherein the metal powder has a particle size between 10 μm and 120 μm.

5. The metal part of claim 3, wherein the metal powder has a particle size between 10 μm and 45 μm, with a median particle size of 30 μm.

6. The metal part of claim 1, wherein the appended insert is a flange.

7. The metal part of claim 1, wherein the preform is configured to be applied to a mold having a face defining a relief of the metal part.

8. The metal part of claim 1, further comprising a plurality of stiffeners extending from an outer surface of the metal part.

9. The metal part of claim 1, wherein the wall thickness is between 1 mm and 2 mm.

10. The metal part of claim 1, wherein the preform is oversized prior to a debinding and sintering manufacturing step to compensate for a shrinkage of the preform.

11. The metal part of claim 1, wherein the appended insert defines a hole.

12. The metal part of claim 11, wherein a portion of the appended insert that defines the hole extends away from the rear end of the preform.

13. The metal part of claim 1, wherein the flexible composite sheet segment is configured to shrink during one of a debinding and a sintering manufacturing step to enclose the fastening portion.

14. The metal part according to claim 1, wherein the metal part is formed by a process comprising:
    mixing a metal powder with a polymer binder to form a composite mixture, the metal powder being particles of an atomized metal alloy;
    making a flexible composite sheet from the composite mixture;
    cutting, in the flexible composite sheet, a preform of the metal part;
    applying the preform in a mold having a face defining a relief of the metal part; and
    debinding and sintering the preform to form the metal part;
    wherein an appended insert has a fastening portion that is sandwiched between a rear end of the preform and a flexible composite sheet segment,
    wherein, before the debinding and sintering step, the composite sheet segment forms a bridge over the fastening portion, the bridge defining a gap between the composite sheet segment, the rear end of the preform, and the fastening portion, and
    wherein, during the debinding and sintering steps, the composite sheet segment deforms to fill the gap and to enclose the fastening portion of the appended insert.

15. The metal part of claim 14, wherein the process further comprises a hot isostatic compaction after the debinding and sintering step.

16. The metal part of claim 14, wherein the mold is a half-shell mold including a stop surface, and the mold is disposed during the debinding and sintering such that the preform is applied in the mold and against the stop surface by gravity.

17. The metal part of claim 14, wherein the process further comprises fastening the appended insert by taking the fastening portion of the appended insert sandwiched between two segments of the flexible composite sheet prior to the debinding and sintering.

18. The metal part according to claim 1,
wherein the preform is cut from the flexible composite sheet,
the appended insert disposed on the preform and extending from the rear end of the preform.

19. The metal part of claim 18, wherein the appended insert is sandwiched between the preform and the flexible composite sheet segment to form a continuous connection.

20. The metal part of claim 18, wherein the flexible composite sheet is shrunk to the preform and the appended insert by a debinding and sintering process.

* * * * *